UNITED STATES PATENT OFFICE.

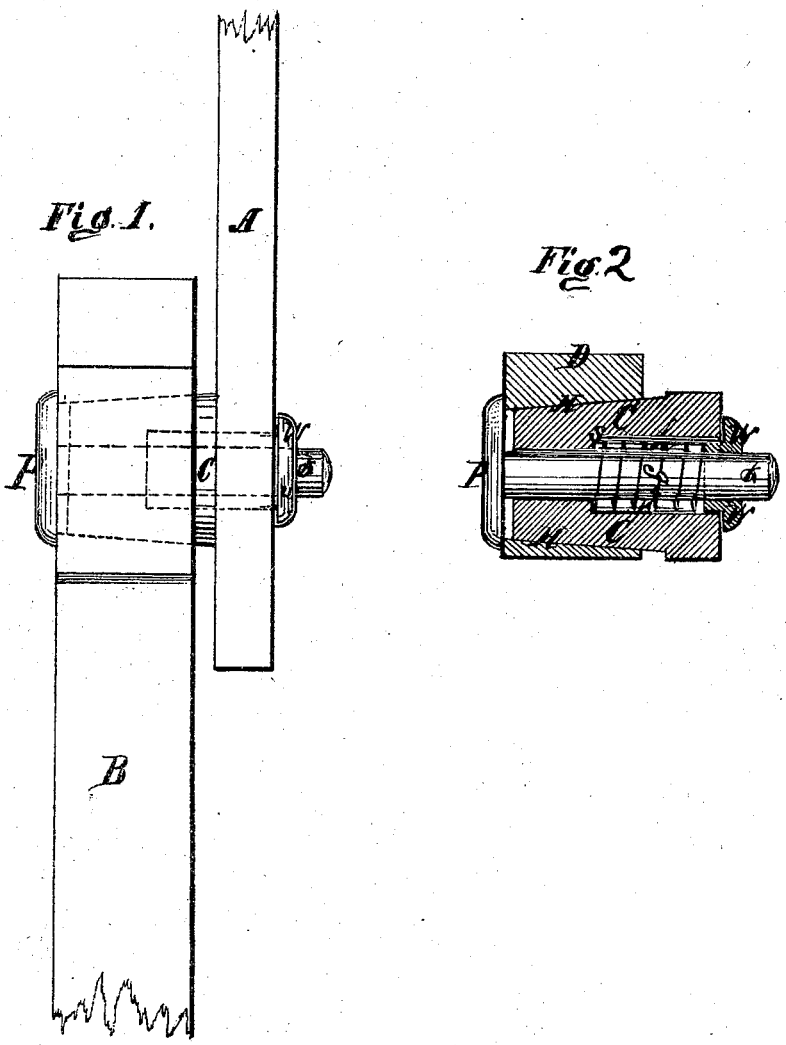

SQUIRE J. GREEN, OF SYRACUSE, NEW YORK, ASSIGNOR TO HIMSELF AND DYER WILLIAMS, OF SAME PLACE.

IMPROVEMENT IN PITMEN-CONNECTIONS FOR HARVESTERS.

Specification forming part of Letters Patent No. 117,409, dated July 25, 1871; antedated July 14, 1871.

*To all whom it may concern:*

Be it known that I, SQUIRE J. GREEN, of the city of Syracuse, in the county of Onondaga and State of New York, have invented a new and Improved Cutter-Bar Head for Harvesters; and I do hereby declare that the following is a full, clear, and exact description of the same, reference being had to the accompanying drawings which form a part of this specification, wherein—

Figure 1 represents a perspective view, and Fig. 2 a sectional view thereof.

A is the pitman, and B the cutter-bar shaft. On the side of the pitman-shaft I make the hollow conical bearing or journal C. The hole $h$ in the bearing C is made with a shoulder, S, to form a space for the operation of the spiral spring $g$. Upon the opposite side of the pitman-shaft A I apply the hollow washer W, with a shoulder, $o$, to set in the hole $h$, and with the hole $n$ through it of the same diameter as the hollow in the bearing C, after passing the shoulder S to the end of the bearing, so that the bolt or pin P, over which is placed the spiral spring $g$, will readily pass through both the bearing C and the hollow washer W. The spiral spring $g$ is made in the usual form, and of sufficient size to slip over the pin P and work easily in the hole $h$ between the end of the washer W and the shoulder S. The cutter-bar shaft has a head, D, in which is the conically-shaped hole H, so formed that the end of bearing C will fit into it and be a little larger than the hole at first.

The parts are put together by inserting the bearing C in the hole H; then insert the pin P at the end of the bearing C, and over the end of it slip the spiral spring $g$. Put on the washer W to hold down the spring and keep the parts steady, securing the same with a key, K. I thus keep the bearing-surfaces in continued contact with each other and prevent their heating.

What I claim as my invention, and desire to secure by Letters Patent, is—

The combination of the spring $g$ with the conical bearing C, having the hollow $h$ shouldered at S, the conical bearing D, pin P, and washer W, all arranged and operating substantially as and for the purpose herein specified.

SQUIRE J. GREEN.

Witnesses:
 N. B. SMITH,
 C. W. SMITH.